INVENTOR.
Edward H. Replogle

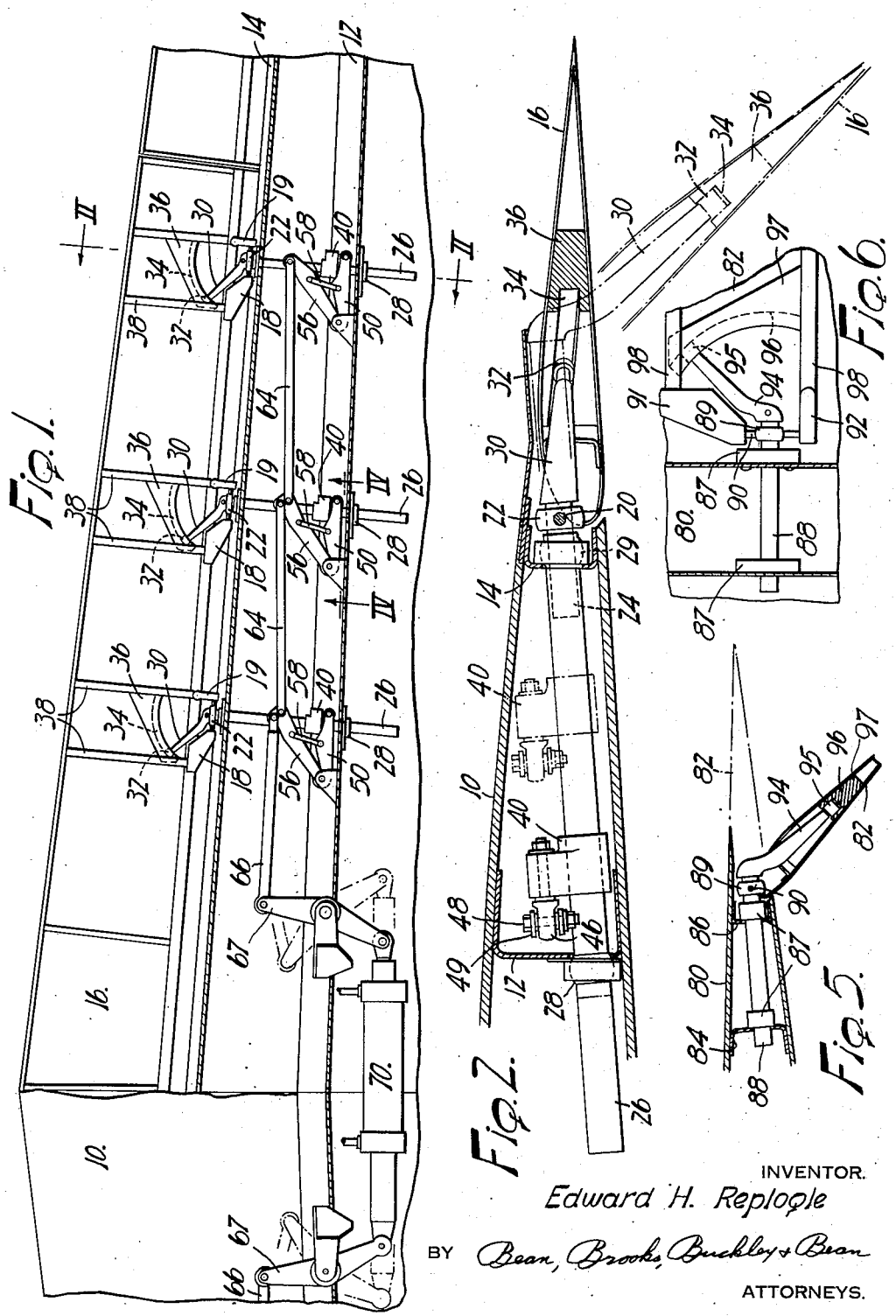

Patented Mar. 2, 1954

2,670,909

UNITED STATES PATENT OFFICE 2,670,909

ACTUATING MECHANISM FOR AIRCRAFT EXTENSIBLE FLAPS

Edward H. Replogle, Kenmore, N. Y., assignor to Bell Aircraft Corporation, Buffalo, N. Y.

Application March 1, 1950, Serial No. 146,947

3 Claims. (Cl. 244—42)

This invention relates to actuating mechanisms for aircraft control surfaces or airfoils such as are referred to as flaps, ailerons, and the like. More particularly, the invention relates to an improved control surface actuating means such as is particularly suited to high speed aircraft wherein relatively thin wing or fin and control surfaces are employed and wherein it is particularly undesirable to permit the control surface actuating mechanism to extend exteriorly of the airfoil contours, although great mechanical advantage and strength is required in the actuating mechanism because of the intensive loads thereon due to high speed operation.

It is an object of the present invention to provide an improved aircraft control surface actuating mechanism which embodies maximum mechanical advantage characteristics in combination with optimum compactness of structure and operating mechanism.

It is another object of the invention to provide an improved control surface actuator mechanism as aforesaid, and which is resistant to flexure and free from binding or jamming tendencies when operating under excessive loads and/or subsequent to service wearing of component parts.

Another object of the invention is to provide a mechanism embodying the features and advantages aforesaid in a structure which is mechanically simple and inexpensive to manufacture, and which is readily adaptable to redesign to suit various applications.

Another object of the invention is to provide a mechanism embodying the features aforesaid which furthermore is adaptable to use within relatively thin airfoil surfaces, such as where dimensional limitations preclude use of conventional crank and link type actuating mechanisms.

Other objects and advantages of the invention will appear in the specification hereinafter.

In the drawing:

Fig. 1 is a fragmentary plan view of a wing and flap structure and flap actuating mechanism of the invention which is adapted to simultaneously displace and angularly adjust the flap relative to the wing;

Fig. 2 is a fragmentary section, on an enlarged scale, taken along line II—II of Fig. 1;

Fig. 5 is a fragmentary section corresponding to Fig. 2 of another form of actuator mechanism of the invention which provides only angular adjustment of the flap; and Fig. 6 is a fragmentary plan view of the mechanism of Fig. 5.

Figure 3:
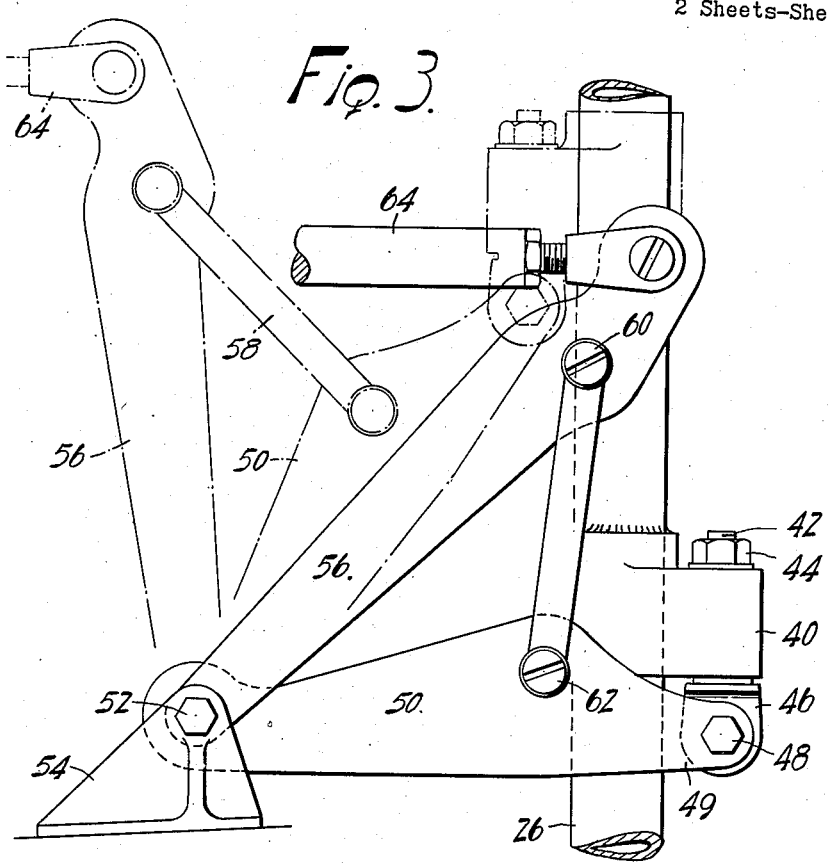
Fig. 3 is a fragmentary plan view, on an enlarged scale, of one of the actuator elements of Figs. 1–2.

The invention is illustrated in Figs. 1-4 in conjunction with an aircraft fixed wing structure indicated generally at 10 and including spaced spar members 12—14. A movable flap member 16 is illustrated to include paired brackets 18—19 at intervals spanwise thereof which engage upon diametrically extending pin portions 20 of yokes 22 which rotatably mount upon stub shafts 24 (Fig. 2) which extend integrally from chordwise disposed torque tubes 26. The tubes 26 are journalled in axially slidable relation in spherical bearings 28—29 carried by the spar members 12—14 so as to be rotatable thereon as well as longitudinally displaceable in directions parallel to the wing chord.

Thus, the flap member 16 is hingedly mounted upon the yoke members 22 which are carried at the rear ends of the tubes 26, for vertical swinging movements about the hinge axes of the yoke pins 20; as well as being thereby carried by the tubes 26 for bodily displacement of the flap 16 in chordwise directions in response to controlled displacements of the tubes 26. At their rear ends the stub shafts 24 are fitted with control horns 30 which are rigidly keyed to the ends of the corresponding stub shafts 26 and are so shaped as to extend obliquely therefrom laterally and rearwardly. At their rear ends the horns 30 are formed with roller knobs 32 which fit into arcuate track grooves 34 of bracket plates 36 which are suitably supported to extend between structural frame members 38 of the flap member 16. The curves of the track grooves 34 are so arranged as to coincide with the sweep of the horn rollers 32 incidental to rotations of the tubes 26 when the parts are so assembled and arranged that the flap 16 is thereby actuated to pivot between the solid line and broken line positions thereof as illustrated in Fig. 2. Thus, the flap 16 is mounted upon the ends of the tubes 26 so as to be pivotable about the axis of the yoke pins 20 for angle of attack adjustments of the flap 16 while at the same time being displaceable bodily in chord-wise direction upon controlled axial movements of the tube 26 for wing slot opening and closing operations.

Figure 4:
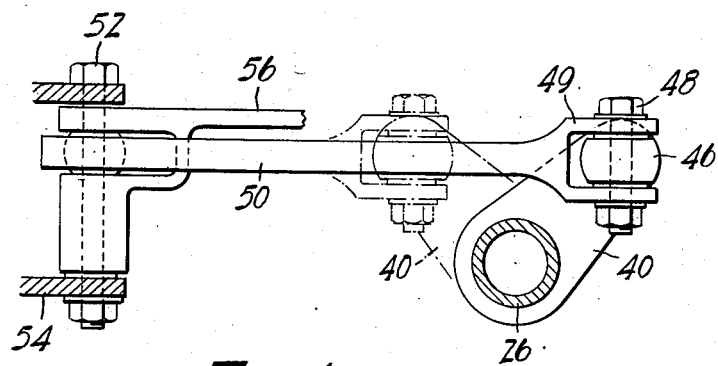
Fig. 4 is a fragmentary section, on an enlarged scale, taken along line IV—IV of Fig. 1.

To control the tubes 26 they are each provided with an integral crank arm 40 which carries a freely rotatable pin 42 to extend therethrough in a direction parallel to the tube 26; the pin 42 being positionally maintained on the crank arm 40 by means of a threaded nut 44 and being formed at its opposite end with a flattened eye portion 46 (Figs. 3-4). A pin 48 extends through the eye portion 46 and engages a clevis end portion 49 of a link 50 which pivotally connects at its other end by means of a pin 52 to a stationary bracket 54 of the wing structure. A power link 56 is also pivotally connected at one end to the pin 52, and a tie link 58 pivotally interconnects the links 50 and 56 by means of pin connections 60—62 (Fig. 3). The swinging end portions of the links 56 are interconnected by means of tie rods 64 (Fig. 1) and a push-pull member 66 is pivotally connected thereto and also to a rocker 67 which is pivotally actuated by means of a hydraulic jack 70; whereby all of the links spanwise of the wing are actuated in unison. When the device is operated to procure pivoting of the links 50 in counterclockwise direction as viewed in Fig. 3 upon their pivots 52, this action causes the tubes 26 to be forced to displace axially in rearwardly direction as viewed in Fig. 3 from the solid line positions of the links 50 toward the broken line positions thereof, whereby the tubes 26 are displaced rearwardly to open the air slot between the main wing and the flap 16. However, because of the link pivot connections 52, the control arms 56 are simultaneously caused to swing through arcs and over as into the broken line position thereof shown in Fig. 3, whereby the tie rods 58 pull upon the links 50 so as to displace them as to the left as viewed in Fig. 3, thereby causing simultaneous rotations of the torque tubes 26 in such manner as to displace the horns 30 toward the left and downwardly so as to depress the flap 16 about its hinge axis as defined by the yoke pins 20. Thus, it will be appreciated that operation of the hydraulic jack 70 will procure displacement of the flap 16 rearwardly so as to open an air slot between the main wing and the flap, while at the same time procuring downward pivoting of the flap 16 into airstream deflected position, as illustrated by broken lines in Fig. 2. Then, upon reverse operation of the jack 70, the flap will pivot upwardly and move to close the slot.

It is a particular feature and advantage of the invention that each tube and horn unit of the invention may be shaped and dimensioned so as to be readily disposed entirely within the sectional profile of the main wing and flap structures, even though such structures are of relatively thin sectional dimensions. Thus, the invention is particularly adaptable to high speed aircraft wherein the wing-flap structures are necessarily of thin sectioned form.

Figs. 5 and 6 illustrate application of the flap actuating mechanism to a non-slotting type wing-flap combination comprising a main wing structure 80 and a flap 82. The wing structure 60 includes spar members 84—86 upon which are mounted bearings 87 journalling a series of parallel torque tubes 88 as in the manner of the mounting of the tubes 26 in Figs. 1-2, except that in the case of Figs. 5-6 the torque tubes are suitably anchored against axial displacements relative to the wing structure. At their rear ends the tubes 88 are slip-fitted through yoke members 89 which include aligned pins 90 extending into pivotal connections with bracket devices 91—92 extending from the frame structure of the flap 82. Thus, the flap is mounted for hinging movement relative to the wing 80 for wing lift control purposes.

At their rear ends the tubes 88 are fitted with horns 94 which extend laterally and rearwardly therefrom in oblique direction and terminate in end rollers 95 which are disposed within arcuate track grooves 96 of bearing plates 97. The plates 97 are anchored within the flap frame structure, such as by being connected to flap ribs 98, and are so disposed that the sweep of the horn rollers 95 maintain the latter within the track grooves of the bearing plates as the torque tubes 88 are rotated in their bearings by any suitable means such as shown, for example, in Figs. 1 and 2, and in such manner as to swing the flap between neutral and deflected positions, as illustrated by the solid and broken line showings thereof in Fig. 5. Thus, it will be understood that the apparatus of Figs. 5-6 will provide wing lift control operation of the flap 82 without opening or closing an air slot between the wing and the flap.

Thus, it will be appreciated that the invention features a flap actuating gear of such type as to be unusually strong and rugged while being at the same time adapted to be completely enclosed within relatively shallow airfoil sections, as is of major importance in connection with high speed aircraft.

Although only a few forms of the invention have been shown and described in detail it will be apparent to those skilled in the art that the invention is not so limited but that various changes may be made therein without departing from the spirit of the invention or the scope of the appended claims.

I claim:

1. In an airplane, in combination, a wing structure, a relatively rigid control surface trailing said wing structure, and a control surface support and control mechanism comprising a strut member mounted upon said wing structure to extend substantially chordwise thereof while being controllably rotatable and axially displaceable thereon, means hinging said control surface to the rear end portion of said strut member to permit vertical pivotal movement of said surface relative to said wing structure for wing-lift control purposes, a horn extending rigidly and obliquely, laterally, and rearwardly from said strut member, slide bearing means rigidly carried by said surface between upper and lower walls thereof and having a diagonally extending track portion arcuately shaped longitudinally of the said surface to coincide with the sweep of the free end of the horn as the latter is rotated and constituting the sole contacting and actuating portion in contact with the horn whereby rotation of said strut member causes the rear end of the horn to traverse said track and thereby alternately elevate and depress said surface as a unit about its hinge axis, and pilot-controlled means operable to cause said strut member to simultaneously rotate and move axially to said wing structure to procure simultaneous pivoting movements of said surface and air slot control movements thereof relative to said wing structure.

2. The structure of claim 1 wherein the control surface is a hollow structure and has stiff upper and lower walls, the front edge portion of the said hollow structure being formed with an opening through which the horn and the strut carrying the horn enter the said hollow structure, the bearing means engaged by the rear end of the horn being a block rigidly mounted in the said hollow structure back of the opening in the front edge portion thereof and having a front surface arcuate longitudinally of the said control surface and provided with a longitudinally extending track in which the rear end of the horn slidably engages.

3. The structure of claim 1 wherein the control surface is a hollow structure and has stiff upper and lower walls and frame members in the hollow structure extending between front and rear edges of the control surface and disposed in transversely spaced relation to each other, the front edge portion of one wall being formed with an opening located between the frame members and through which the horn and the strut enter the hollow structure, the bearing means engaged by the horn being a stiff block rigidly mounted between the frame members intermediate ends thereof and having a concaved front edge face arcuate longitudinally and formed with a longitudinally extending groove in which the gear end of the horn slidably engages.

EDWARD H. REPLOGLE.

References Cited in the file of this patent

UNITED STATES PATENTS

| Number | Name | Date |
| --- | --- | --- |
| 1,823,069 | Stroop | Sept. 15, 1931 |
| 2,153,667 | Hoekstra | Apr. 11, 1939 |
| 2,451,009 | Williams | Oct. 12, 1948 |